United States Patent
Skelton et al.

(10) Patent No.: US 11,652,731 B2
(45) Date of Patent: May 16, 2023

(54) DYNAMIC ROUTING OF QUEUED NETWORK-BASED COMMUNICATIONS USING REAL-TIME INFORMATION AND MACHINE LEARNING

(71) Applicant: Surescripts, LLC, Arlington, VA (US)

(72) Inventors: Thomas K. Skelton, Rockwood, PA (US); Jeffrey B. Sponaugle, Hillsboro, OR (US); Andrew Mellin, St Paul, MN (US); Keith Willard, St Paul, MN (US)

(73) Assignee: Surescripts, LLC, Arlington, VA (US)

( * ) Notice: Subject to any disclaimer, the term of this patent is extended or adjusted under 35 U.S.C. 154(b) by 0 days.

(21) Appl. No.: 17/366,569

(22) Filed: Jul. 2, 2021

(65) Prior Publication Data

US 2022/0006724 A1 Jan. 6, 2022

Related U.S. Application Data

(60) Provisional application No. 63/048,021, filed on Jul. 3, 2020.

(51) Int. Cl.
*H04L 45/122* (2022.01)
*H04L 47/52* (2022.01)
*H04L 45/302* (2022.01)
*H04L 45/42* (2022.01)

(52) U.S. Cl.
CPC .......... *H04L 45/122* (2013.01); *H04L 45/306* (2013.01); *H04L 45/42* (2013.01); *H04L 47/522* (2013.01)

(58) Field of Classification Search
CPC ..... H04L 45/122; H04L 45/306; H04L 45/42; H04L 47/522
See application file for complete search history.

(56) References Cited

U.S. PATENT DOCUMENTS

| | | | |
|---|---|---|---|
| 10,921,147 B1* | 2/2021 | Hapgood | G06Q 10/06311 |
| 2006/0224414 A1* | 10/2006 | Astrup | G16H 10/60 705/2 |
| 2010/0125461 A1* | 5/2010 | Heald | G06Q 30/06 705/2 |
| 2012/0096023 A1* | 4/2012 | Park | G06Q 30/0283 707/769 |
| 2012/0253829 A1* | 10/2012 | John | G16H 40/67 705/2 |
| 2012/0253831 A1* | 10/2012 | John | G06Q 40/00 705/2 |

(Continued)

*Primary Examiner* — Mohamed A. Wasel
*Assistant Examiner* — Jihad K Boustany
(74) *Attorney, Agent, or Firm* — Weaver IP L.L.C.

(57) ABSTRACT

Methods for dynamic routing of queued network-based communications using real-time information and machine learning are performed by systems and devices. Requests associated with fulfillments are received over a network from requestor systems, and the requests are queued in a data structure of a queue. Information that includes geolocation information from a user device of a user that is associated with the fulfillment, temporal information from the user device, or related request information associated with another request is then received over the network, and a fulfiller and a fulfillment time for the fulfillment are determined from the information. The request is provided from the queue to the fulfiller at the fulfillment time over the network.

17 Claims, 6 Drawing Sheets

(56) References Cited

U.S. PATENT DOCUMENTS

| | | | | |
|---|---|---|---|---|
| 2016/0342748 A1* | 11/2016 | Gulfo | ................ | G06Q 30/0639 |
| 2018/0075215 A1* | 3/2018 | Loiacono | ................ | G16H 20/10 |
| 2020/0219055 A1* | 7/2020 | Nagar | ................ | G06Q 10/0833 |
| 2021/0082032 A1* | 3/2021 | Smith | ................ | G06Q 10/087 |

* cited by examiner

| Queue position | Date/Time received | Patient/User/ Customer info. | Request/ Requestor info. | Default fulfiller |
|---|---|---|---|---|
| 1 | Date-Time 1 | John Smith; ... | Dr. 1... /eRx 1 | Pharmacy 1 |
| 2 | Date-Time 2 | Jane Smith; ... | Dr. 2... /eRx 2 | Pharmacy 1 |
| 3 | Date-Time 3 | Marcus Kelly; ... | Dr. 3... /eRx 3 | Pharmacy 2 |
| 4 | Date-Time 4 | Joan Wu; ... | Dr. 4... /eRx 4 | Pharmacy 3 |
| 5 | Date-Time 5 | John Smith; ... | Dr. 1... /eRx 5 | Pharmacy 4 |
| ... | | | | |

DYNAMIC ROUTING OF QUEUED NETWORK-BASED COMMUNICATIONS USING REAL-TIME INFORMATION AND MACHINE LEARNING

CROSS-REFERENCE TO RELATED APPLICATION(S)

The present application claims priority to U.S. Provisional Application No. 63/048,021, filed on Jul. 3, 2020, and entitled "DYNAMIC ROUTING OF QUEUED NETWORK-BASED COMMUNICATIONS USING REAL-TIME INFORMATION AND MACHINE LEARNING," the entirety of which is incorporated by reference herein.

BACKGROUND

Electronic transactions that occur over a network include an initial request by a requestor, transmission of the request as data over a network to a fulfiller, and some processing of the data by the fulfiller in order to fulfill the request. Some current solutions involve the requestor providing the fulfiller identity/information as part of the request, however, when real-time changes associated with the fulfillment happen subsequent to the request being transmitted, inefficiencies in requestor, network, and fulfillment system utilization occur.

BRIEF SUMMARY

Methods, systems, and apparatuses are described for dynamic routing of queued network-based communications using real-time information and machine learning, substantially as shown in and/or described herein in connection with at least one of the figures, as set forth more completely in the claims. Requests associated with fulfillments are received over a network from requestor systems, and the requests are queued in a data structure of a queue. Information that includes geolocation information from a user device of a user that is associated with the fulfillment, temporal information from the user device, or related request information associated with another request is then received over the network, and a fulfiller and a fulfillment time for the fulfillment are determined from the information. The request is provided from the queue to the fulfiller at the fulfillment time over the network.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

Figure 1:
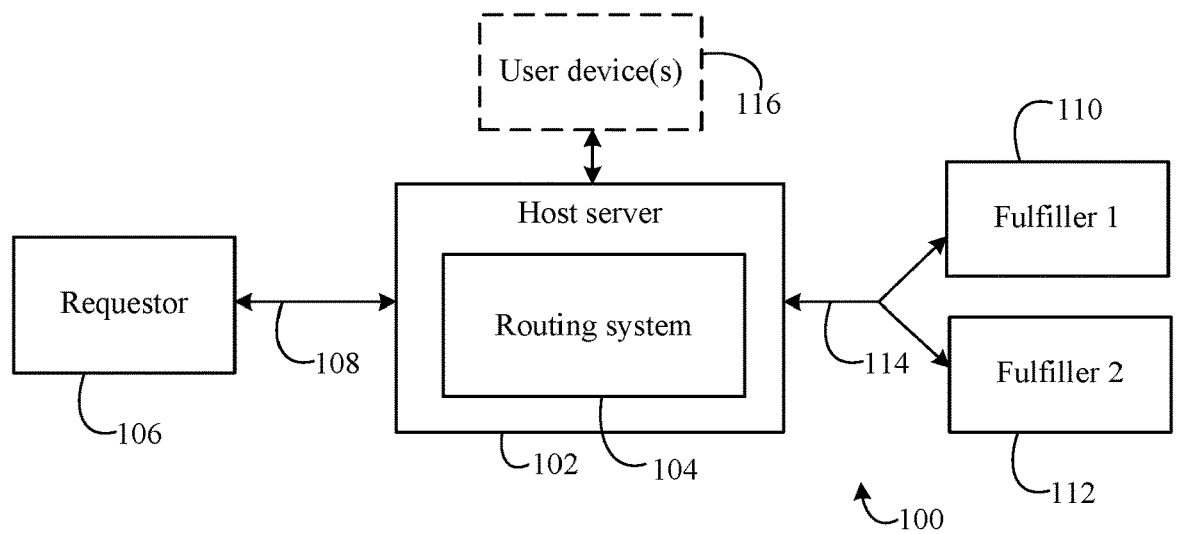
FIG. 1 shows a block diagram of a computer system for dynamic routing of queued network-based communications using real-time information and machine learning, according to an example embodiment.

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. The use of "or" herein may be interchangeable with the term "and/or" unless otherwise stated.

If the performance of an operation is described herein as being "based on" one or more factors, it is to be understood that the performance of the operation may be based solely on such factor(s) or may be based on such factor(s) along with one or more additional factors. Thus, as used herein, the term "based on" should be understood to be equivalent to the term "based at least on."

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Still further, it should be noted that the drawings/figures are not drawn to scale unless otherwise noted herein.

Numerous exemplary embodiments are now described. Any section/subsection headings provided herein are not intended to be limiting. Embodiments are described throughout this document, and any type of embodiment may be included under any section/subsection. Furthermore, it is contemplated that the disclosed embodiments may be combined with each other in any manner. That is, the embodiments described herein are not mutually exclusive of each other and may be practiced and/or implemented alone, or in any combination.

II. Example Embodiments

The present subject matter relates to real-time queuing and routing of data over a network. Embodiments provide for methods, systems, and apparatuses for dynamic routing of queued network-based communications using real-time information and machine learning. The example techniques and embodiments described herein may be adapted to various types of systems and devices, for example but without limitation, computing systems (e.g., computers/computing devices such as desktops, laptops, etc., and servers, enterprise computing systems, etc.), communication devices (e.g., cellular and smart phones, tablets, smart watches, etc.), and/or the like, that communicate information and data that relates to, without limitation, electronic prescriptions (eRx), product purchasing orders, service or medical appointments, etc., in different ways, in accordance with embodiments. For instance, computing systems that communicate over a network for fulfillment of an eRx prescribed by a doctor to be filled by a pharmacy, may be configured according to the described embodiments and techniques.

While the embodiments herein may be described with respect to various computing systems and implementations as conceptual and/or illustrative examples for descriptive consistency, other types of electronic and communication devices and implementations are also contemplated for implementing the disclosed techniques. It is contemplated herein that in various embodiments and with respect to the illustrated figures of this disclosure, one or more components described and/or shown may not be included and that additional components may be included.

Additionally, while the embodiments herein may be described with respect to eRx scenarios, they are not so limited, as noted above. However, embodiments may be exemplarily described in the context of requestors, e.g., doctors, patients, etc., and fulfillers, e.g., pharmacies, as illustrative of the more general techniques that encompass the embodiments herein, while other embodiments contemplated herein may be realized, by way of example and not limitation, in the context of purchaser-users as requestors and sellers and/or shippers as fulfillers.

In the eRx context, prior solutions allow for an eRx to be created, e.g., by a prescribing doctor, where the doctor is typically prompted or asked to select a dispensing pharmacy in their electronic system. This choice of dispensing pharmacy may be based on the patient preference at the time the prescription is generated, or from an option selected at an earlier date. Once this selection is made, the prescription is routed into the pharmacy system having the selected designation indicated. Exemplary embodiments herein, however, provide for the ability to have the final 'selection' for the fulfiller deferred, even if initially designated by the requestor, to a later time/date via queuing of the network-based communications. In the context of eRx, the electronic network-based communications for the eRx are queued so that it may be dynamically routed at a subsequent time using real-time information and/or machine learning. In different embodiments, other types of deferment are contemplated via various architectures and/or implementations, such as but not limited to waiting queues, routing queues, other temporary storage mechanisms, or some other user directed holding pattern.

As one example, a patient for whom an eRx is prescribed is enabled direct the eRx to be in a holding queue until such time as the patient is near a particular pharmacy, and at that time, the eRx could be released and transmitted to the selected pharmacy. Embodiments herein provide for numerous implementations to achieve such dynamic routing of queued network-based communications using real-time information and/or machine learning, including but without limitation, geolocation-based including real-time determinations, availability-based including real-time determinations, time of day, state or local advisory conditions, and/or the like. Additional, exemplary embodiments are described below for illustrative purposes.

Systems and devices may be configured in various ways for dynamic routing of queued network-based communications using real-time information and/or machine learning, according to embodiments. For instance, in FIG. 1, a block diagram of a network of computer systems 100 ("system 100" herein) that includes a routing system 104 is shown, according to an example embodiment. System 100 includes a host server 102 that may include one or more processing devices such as, but not limited to, servers. Routing system 104 is illustrated as a portion of host server 102. Additionally, system 100 includes a requestor system 106 that communicates electronically with host server 102 via a communication link 108, and a first fulfiller system 110 and a second fulfiller system 112 that communicate electronically with host server 102 via a communication link 114. Requestor system 106, first fulfiller system 110, and second fulfiller system 112 may also include one or more processing devices such as, but not limited to, servers and client devices such as laptop/desktop computers and computer terminals, personal handheld devices, etc. In embodiments, at least one user device(s) 116 is enabled to communicate with components of system 100 via known networks and/or communication links.

User device(s) 116 may be any number, type, or combination of computing devices or computing systems, including a terminal, a personal computer, a laptop computer, a tablet device, a smart phone, a personal digital assistant, and/or the like, utilized to execute functions/operations described herein for gathering information related to requests/fulfillments for users/patients/customers. Information gathered, includes without limitation, Global Positioning System (GPS) information, fulfillment preferences, travel information, future location indicia, software application information, and/or the like. User device 116 may also include additional components (not shown for brevity and illustrative clarity) including, but not limited to, components and subcomponents of other devices and/or systems herein, in embodiments.

Host server 102 may comprise one or more computers/servers of a host entity facilitating access to routing system 104 by requestor system 106, first fulfiller system 110, and/or second fulfiller system 112, according to embodiments. Host server 102 may include geographically distributed computers/servers, a rack server system(s), a standalone server(s), cloud-based and/or on premise servers, etc., in various embodiments. Example implementations of host server 102 also provide for host server 102 being a third-party entity with respect to requestor system 106, first fulfiller system 110, and/or second fulfiller system 112.

Requestor system 106, first fulfiller system 110, and/or second fulfiller system 112 may comprise one or more computers/servers of an entity, such as a vendor service(s), a doctor or doctor's office (including nurses and/or other staff), a pharmacy, a patient, and/or the like as noted herein, that is associated with a generated eRx. In other embodiments, requestor system 106, first fulfiller system 110, and/or second fulfiller system 112 are associated with users, purchasers or consumers, retailers, grocers, wholesalers, shipping/delivery entities, service providers, etc.

Communication link 108 and/or communication link 114 may each comprise at least one network or direct communication connection, or any combination thereof, between host server 102 and requestor system 106, first fulfiller system 110, and/or second fulfiller system 112, that enables communication messages such as requests/responses for eRx fulfillment, or other communication message related to, e.g., purchases and delivery/pick-up of goods or services, as described herein, along with any associated electronic messages required. As used herein, the term "messages," "communication messages," etc., includes without limitation electronic communications data, information, packets, and/or the like, associated with requests, purchases, appointment or other schedulings, etc., for fulfillments thereof. In embodiments, communication link 108 and/or communication link 114 may comprise wired and/or wireless portions of one or more networks such as networks of the host entity and requestors, including enterprise networks, the Internet, etc.

Routing system 104 may comprise hardware and/or software components configured to perform operations for dynamic routing of queued network-based communications using real-time information and/or machine learning, as further described herein. As one example, in the context of eRx, requestor system 106 comprises a computing device of a doctor or doctor's office by which a patient is prescribed a pharmaceutical drug via an eRx. The doctor, e.g., may specify that the eRx be transmitted to first fulfiller system 110 via communication link 108, however routing system 104 is configured to queue the eRx, according to embodiments. It may subsequently be determined by routing system 104, either by notice from the patient, by geolocation data of the patient and/or other real-time data associated with the patient (e.g., from one of user device(s) 116), drug availability information (including real-time information), etc., that second fulfiller system 112 receive the eRx for fulfillment, and routing system 104 is configured to transmit the eRx from host server 102 via communication link 114 to second fulfiller system 112. Example implementations of routing system 104 also provide for routing system 104 being a third-party entity with respect to requestor system 106, first fulfiller system 110, and/or second fulfiller system 112.

In embodiments, one or more of any component shown in system 100 of FIG. 1 may be present in various implementations.

Figure 2:
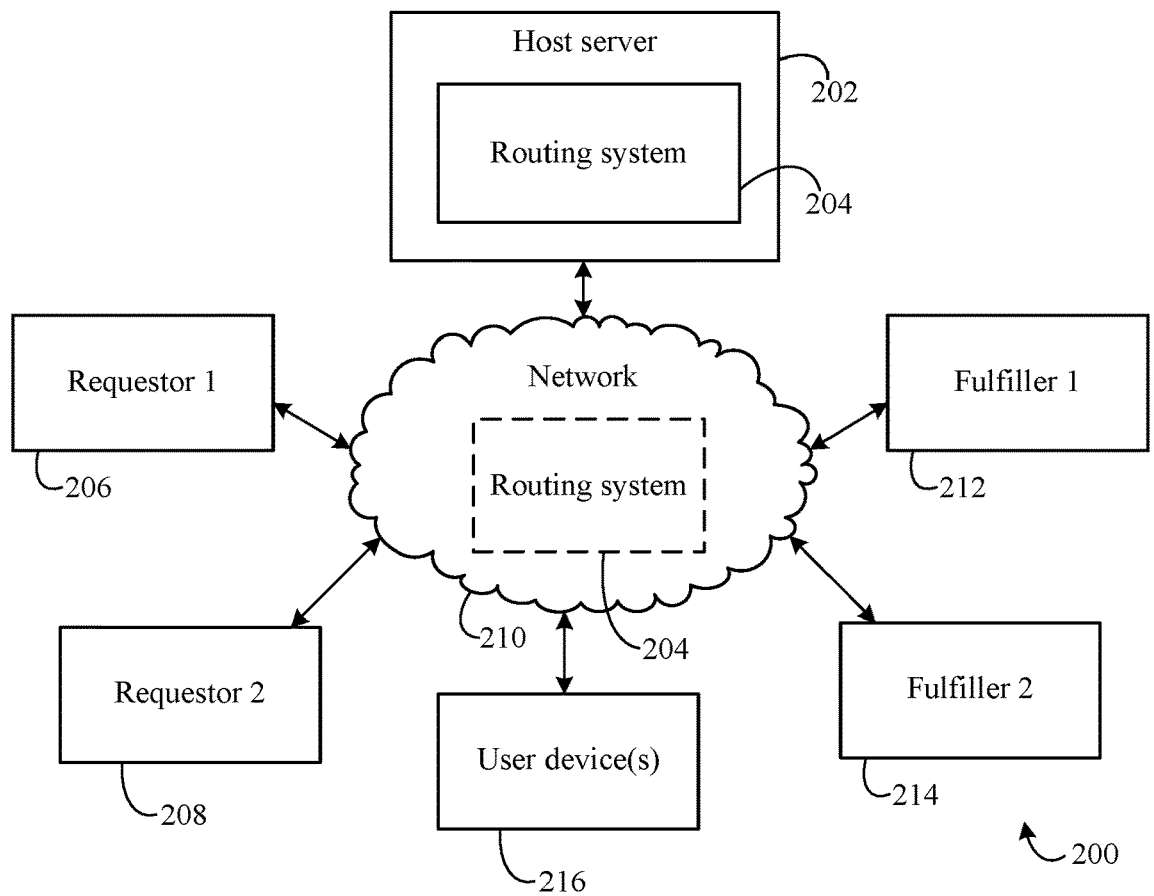
FIG. 2 shows a block diagram of a network of computer systems for dynamic routing of queued network-based communications using real-time information and machine learning, according to an example embodiment.

Turning now to FIG. 2, a block diagram of a network of computer systems 200 is shown, according to an embodiment. Network of computer systems 200 ("system 200" herein) may be a further embodiment of system 100 of FIG. 1. System 200 includes a host server 202 having a routing system 204, which may be embodiments of host server 102 and routing system 104 of FIG. 1, respectively. System 200 also includes a requestor system 206 and a requestor system 208, which may be embodiments of first requestor system 106 of FIG. 1, and a fulfiller system 212 and a fulfiller system 214, which may be embodiments of first fuller system 110 and/or second fulfiller system 112 of FIG. 1. In embodiments, system 200 may include and/or communicate with one or more user devices 216, which may be embodiments of user device(s) 116 of FIG. 1. The above-described components of system 200 may be communicatively coupled or linked to each other via a network 210.

As noted, host server 202 may be a further embodiment of host server 102 of FIG. 1, and, for the purposes of illustration for FIG. 2, is configured the same, or substantially the same, as host server 102 above. Network 214 may be a further embodiment of communication link 108 and/or communication link 114 of FIG. 1. Network 214 may comprise at least one network and/or direct connection (i.e., a communication link), or any combination thereof. That is, network 214 may be any combination of the Internet, the "cloud," direct communication links, business and/or enterprise networks, and/or the like.

As noted, network 214 is configured to communicatively couple host server 202, requestor system 206, requestor system 208, fulfiller system 212, and a fulfiller system 214 to each other. Accordingly, the network of computer systems shown as system 200 is configured as a further embodiment of the network of computer systems shown as system 100 of FIG. 1 in that routing system 204 of host server 202 is configured to perform dynamic routing of queued network-based communications using real-time information and/or machine learning as described herein.

With respect to FIG. 2, while shown for illustrative simplicity and brevity as including a single host (e.g., host server 202), two requestor systems, and two fulfiller systems, it is contemplated herein that system 200 may include more or fewer of any of these components, as well as different types of remote systems, as described herein or as otherwise would be understood by persons of skill in the relevant art(s) having the benefit of this disclosure, in embodiments. For instance, any number of requestor systems and/or fulfiller systems may be supported for dynamic routing of queued network-based communications using real-time information and/or machine learning, where the requestor systems are related to or associated with each other, or not, and where the fulfiller systems are related to or associated with each other, or not. Additionally, requestor system 206 and/or requestor system 208 may be systems comprising computing devices for doctors, patients (e.g., for prescription refills), consumers/buyers, etc., and fulfiller system 212 and/or fulfiller system 214 may be systems comprising computing devices for pharmacies, retailers, grocers, shipping/delivery entities, service providers, etc. Likewise, and as similarly described above for FIG. 1 and user device(s) 116, user device(s) 216 may communicate with routing system 204 via network 210.

Figure 3:
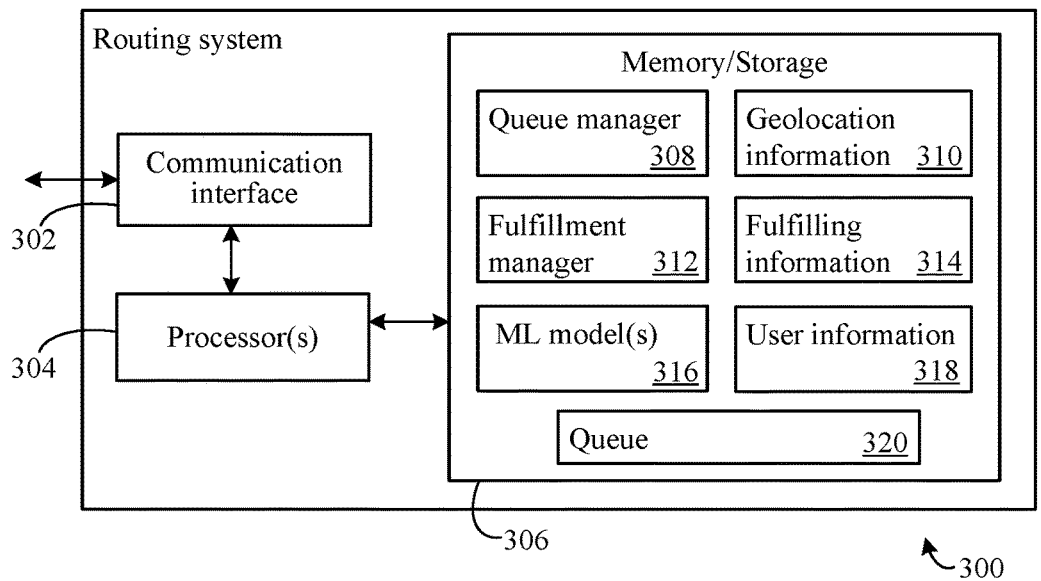
FIG. 3 shows a block diagram of a system for dynamic routing of queued network-based communications using real-time information and machine learning, according to an example embodiment.

Turning now to FIG. 3, a block diagram of a system 300 is shown for dynamic routing of queued network-based communications using real-time information and/or machine learning, according to an example embodiment. System 300 as exemplarily illustrated and described is configured to be an embodiment of routing system 204 of system 200 in FIG. 2. System 300 is described as follows.

System 300 may comprise a computing device or system which is any type of server or computing system, as mentioned elsewhere herein, or as otherwise known, including without limitation cloud-based systems, on-premises servers, distributed network architectures, and/or the like. As shown in FIG. 3, computing system 300 includes one or more processors ("processor") 304, one or more of a memory and/or other physical storage device ("memory") 306, as well as one or more communication interfaces 302 which may be network interfaces in embodiments.

System 300 is illustrated as including a queue manager 308 and a fulfillment manager 312 configured to perform dynamic routing of queued network-based communications using real-time information and/or machine learning, according to embodiments.

Processor 304 and memory 306 may respectively be any type of processor circuit(s)/system(s) and memory that is described herein, and/or as would be understood by a person of skill in the relevant art(s) having the benefit of this disclosure. Processor 304 and memory 306 may each respectively comprise one or more processors or memories, different types of processors or memories (e.g., at least one cache for query processing), remote processors or memories, and/or distributed processors or memories. Processor 304 may be multi-core processors configured to execute more than one processing thread concurrently. Processor 304 may comprise circuitry that is configured to execute computer program instructions such as, but not limited to, embodiments of queue manager 308 and/or fulfillment manager 312, including one or more of sub-components thereof, which may be implemented as computer program instructions, as described herein.

Memory 306 includes volatile storage portions such as a random access memory (RAM) and/or persistent storage portions such as hard drives, non-volatile RAM, and/or the like, to store or be configured to store computer program instructions/code for dynamic routing of queued network-based communications using real-time information and/or machine learning as described herein, as well as to store other information and data described in this disclosure including, without limitation, queue manager 308 and/or fulfillment manager 312, and/or the like, in different embodiments. Memory 306 also includes storage of data, information, and/or machine learning (ML) models, according to embodiments. For instance, geolocation information 310, fulfilling information 314, ML model(s) 316, user information 318, and/or a queue 320 may be stored in memory 306 according to embodiments. Such information and data may be stored in various forms, such as in a database(s), lists, unstructured data storage, and/or the like.

Communication interface 302 may be any type or number of wired and/or wireless communication or network adapters, modems, etc., configured to enable system 300, to communicate intra-system with components thereof, as well as with other devices and/or systems over a network, such as communications between system 300 and other devices, systems, hosts, as described for system 100 in FIG. 1 and/or system 200 in FIG. 12, over a network such as network 210.

System 300 also includes additional components (not shown for brevity and illustrative clarity) including, but not limited to, components and subcomponents of other devices and/or systems herein, as well as those described below with respect to FIGS. 5-6, according to embodiments.

As noted above, system 300 may include queue manager 308 and/or fulfillment manager 312, which may be services or applications, e.g., embodied as software that executes on system 300, in embodiments. Queue manager 308 is configured to store and/or queue requests for fulfillments in queue 320 that are received from requestors or requestor systems, e.g., requestor system 206 and/or requestor system 208 in FIG. 2, as described herein. Requests from requestors may be queued in memory 306 by queue manager 308 in any appropriate data structure of queue 320. Fulfillment manager 312 is configured to notify queue manager 308 for de-queuing requests that are queued based on fulfillment conditions or criteria described herein. Fulfillment manager 312 is configured to determine when the conditions/criteria for fulfillment are met based on data and information associated with geolocation information 310 (e.g., real-time/future locations of user devices, locations of fulfillers, a location of a fulfiller specified by a user and provided via a user device, etc.), fulfilling information 314 (names, locations, hours of operation, real-time information including customer density at locations, personnel availability, inventory, delivery of products to fulfillers, etc., for fulfillers, as well as information related to fulfillment requests such as eRx details, purchasing/product details, etc.), ML model(s) 316, and/or user information 318 (user names, contact information, insurance information, user calendar information, user transportation/travel information (including frequency), user preferences for fulfillment, user device application information, etc., that may include real-time information). Fulfillment manager 312 is also configured to transmit, or cause transmission of, the de-queued requests to a fulfiller, e.g., fulfiller system 212 and/or fulfiller system 214 of FIG. 2.

Figure 4:
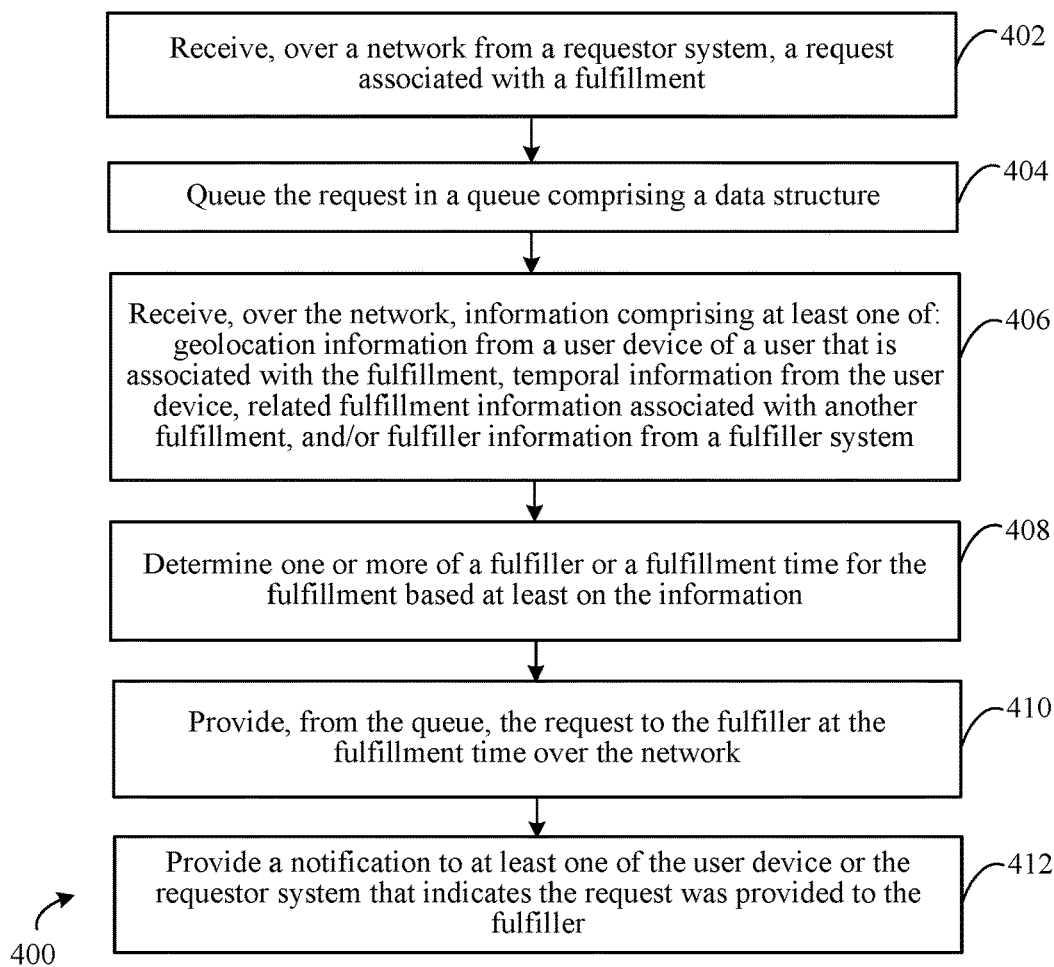
FIG. 4 shows a flowchart for dynamic routing of queued network-based communications using real-time information and machine learning, according to an example embodiment.

FIG. 4 shows a flowchart 400 for dynamic routing of queued network-based communications using real-time information and/or machine learning, in accordance with an example embodiment. Further structural and operational examples will be apparent to persons skilled in the relevant art(s) based on the following descriptions. Flowchart 400 is described as follows with respect to system 200 of FIG. 2 and system 300 of FIG. 3.

Flowchart 400 begins at step 402. In step 402, a request associated with a fulfillment is received over a network from a requestor system. For example, a request from requestor system 206 or requestor system 208 described for FIG. 2 is received via communication interface 302 of system 300 in FIG. 3. In embodiments, the request is an eRx request provided from a physician or physician's office over network 210. This request is associated with a fulfillment by a fulfiller, such as fulfiller 212 or fulfiller 214, e.g., as determined according to the steps of flowchart 400 described here.

In step 404, the request is a queued in a queue that comprises a data structure. For example, the request received in step 402 is placed into a data structure of a queue, such as queue 320 in FIG. 3, by queue manager 308. In embodiments, queue manager 308 may comprise program code that is executable/executing by/on processor(s) 304 of system 300 in FIG. 3 to enter the request at the foot, or end, of the queue. Further details regarding this queue are provided below with respect to FIG. 5.

In step 406, information comprising at least one of geolocation information from a user device of a user that is associated with the fulfillment, temporal information from the user device, or related request information associated with another request is received over the network. For instance, the received information may be stored as geolocation information 310, fulfilling information 314, and/or user information 318 in system 300, respectively. Geolocation information may include a location of the user device, locations of possible fulfillers for the request, predicted locations of the user device in the future, etc. Temporal information may include a specific time at which a user of the user device desires fulfillment to be complete (e.g., so that the user may acquire a prescription from a pharmacy, groceries from a store, etc., may be at their home to receive a delivery, and/or the like). Temporal information may correspond to geolocation information in embodiments (e.g., when a user will be physically near or in the general vicinity of a fulfiller location). In embodiments, temporal information may indicate a user preference to have fulfillment in general, or for a specific request or type of request, completed as soon as possible. Related request information may be information for another request that is already in queue 320, or that is subsequently queued in queue 320, and may enable linking of requests for batched provision to a fulfiller that provides queuing, network, and/or fulfillment efficiencies. Related request information is discussed in further detail with respect to FIG. 6 below and other embodiments herein. The geolocation, temporal, and related request information received may be stored persistently by system 300, in embodiments. In some embodiments, the information received in step 406 may also comprise fulfiller information from a fulfiller system which may also be stored as a portion of fulfilling information 314.

In step 408, a fulfiller and a fulfillment time for the fulfillment are determined based at least on the information. For example, fulfillment manager 312 is configured to determine fulfillers and fulfillment times based at least on the information provided in step 408. The determinations may, in embodiments, also be based at least on other requests/transactions related to a user or user's representative, ML model(s) 316 in FIG. 3, laws and regulations, fulfilling information provided from a requestor in the request (e.g., in an eRx context, only allowing a request to be provided to a fulfiller after a specified period of time has passed since a prior request was fulfilled), etc. As illustrative examples, geolocation information provided from the user device may indicate a proximity to a fulfiller which may cause fulfillment manager 312 to select that fulfiller and a time for fulfillment which may then be provided to the user device (e.g., via text, an application executing on the user device, and/or the like); similarly, a fulfiller nearest the home address of the user may be determined as able to fulfill the request immediately based on temporal information provided from the user device indicating that a quick fulfillment is desired; likewise, related request information may be received and queued in queue 320, from which it may be determined by fulfillment manager 312 that two or more requests are available to be linked based on common factors thereof for concurrent distribution to a fulfiller at a given/determined time, or not.

In step 410, the request is provided from the queue to the fulfiller at the fulfillment time over the network. For instance, fulfillment manager 312 determines the fulfiller and the fulfillment time in step 408, and based at least on this determination, the corresponding entry for the request is de-queued from queue 320 by queue manager 308 and provided over the network to the fulfiller at the determined fulfillment time. In some embodiments, the request may be provided alone, while in other embodiments, the request may be provided with other queued requests in batches. It is also contemplated herein that providing the request in step 410 may be performed responsive to receiving the information in step 406, and/or responsive to receiving the information and determining the fulfiller and the fulfillment time in step 408.

In step 412, a notification is provided to at least one of the user device or the requestor system that indicates the request was provided to the fulfiller. For example, a user or a prescriber may be notified by text, email, telephone call (e.g., automated), alerts and/or notifications in applications, etc., that the request has been provided to the fulfiller for fulfillment, and such notifications may include the time at which the request was provided and may cause an application at a device/system receiving the notification to become active from an inactive state. The notification may be provided, or be caused to be provided, by fulfillment manager 312, in embodiments.

Figures 5, 6:
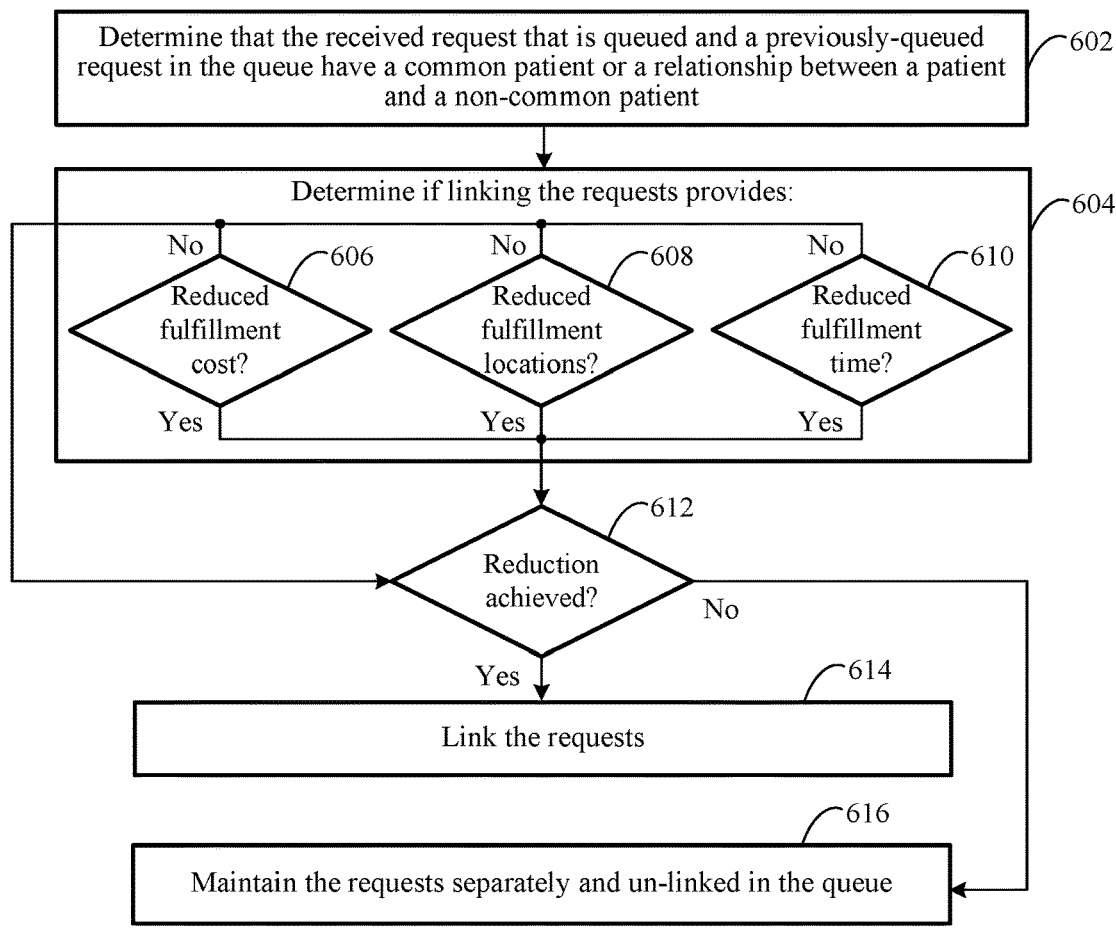
FIG. 5 shows a queue having a data structure for dynamic routing of queued network-based communications using real-time information and machine learning, according to an example embodiment.
FIG. 6 shows a flow diagram for dynamic routing of queued network-based communications using real-time information and machine learning, according to an example embodiment.

In the context of FIGS. 3 and 4, FIG. 5 will now be described. FIG. 5 illustrates a queue 500 for dynamic routing of queued network-based communications using real-time information and/or machine learning, according to an example embodiment. Queue 500 may be an embodiment of queue 320 of FIG. 3, and is exemplarily illustrated according to a data structure as shown, although embodiments are not so limited and additional/alternative data structures and/or data fields of queue 500 are contemplated herein. Queue 500 is shown in the example context of queuing and fulfillment of eRx requests.

Queue 500 is shown as including a plurality of entries 502 (5 shown for brevity and clarity of illustration, although other numbers of entries, without limit on number, are contemplated) for requests received. Each entry of entries 502 may include data associated with its respective request. As exemplarily illustrated, entries 502 comprise data fields 504. Data fields 504 include, without limitation, a queue position, a date/time received, patent, user, and/or customer information, request and/or requestor information, and a default fulfiller for the request.

The queue position field may be an integer, a data structure memory address, a unique identifier, and/or the like in different embodiments, and may identify a particular request entry in the queue. This identification may be used in the de-queuing of entries by queue manager 308 of FIG. 3, e.g., when requests are sent to fulfillers from queue 500, in the linking of queued requests by fulfillment manager 312, e.g., to increase fulfillment and queuing/de-queuing efficiencies, etc. In some embodiments, queue 500 may operate as a first-in-first-out (FIFO) queue by default where a head and a tail of queue 500 may be tracked for this purpose based on values in the queue position filed, as would be understood by persons of skill in the relevant art(s) having the benefit of this disclosure. Entries stored in queue 500 may be given a default life-span at the end of which requests are provided to a fulfiller in the default fuller field. This provides for efficient queue management and clean up that reduces memory footprint for stale data being maintained in queue 500. In embodiments, requests provided to a default fulfiller based on end-of-life-span FIFO criteria may include information instructing the fulfiller hold the request until approved by a user, patient, customer, and/or the like. The date/time received field may include a calendar date that a request is received (e.g., day, month, and year), a time of day that a request is received, and/or other temporal identifiers, which may also, or alternatively, be used for queue entry lifetime determinations, as well as being provided to fulfillers.

The patient, user, and/or customer information field may include names, physical addresses and/or other contact information, dates-of-birth, insurance information, etc., to identify the patient, user, and/or customer for which the request is to be fulfilled. The request and/or requestor information field provides information regarding the requestor and the request itself. As shown in the context of an eRx, a doctor may prescribe a medication or treatment via prescription such as an eRx, and details therefor from the request and for doctor are included in this field. This field and/or the patient, user, and/or customer information field may be used to determine if requests should be linked, as described in further detail below. The default fulfiller field for the request includes information that identifies a fulfiller that will be used no other actions are taken based on the embodiments herein for de-queuing and providing requests to fulfillers.

Referring also now to FIG. 6, a flow diagram 600 is shown for dynamic routing of queued network-based communications using real-time information and/or machine learning, according to an example embodiment. Further structural and operational examples will be apparent to persons skilled in the relevant art(s) based on the following descriptions. Flow diagram 600 may be an embodiment of flowchart 400, and is described as follows with respect to FIGS. 2-5.

Flow diagram 600 begins at step 602. In step 602, it is determined that the received request that is queued and a previously-queued request in the queue have a common patient or a relationship between a patient and a non-common patient. For example, queue manager 308 and/or fulfillment manager 312 may be configured to determine commonalities, correlations, and/or the like between requests in a queue, such as queue 500 of FIG. 5. In non-limiting examples, two or more queued requests may be for the same user, patient, or customer, may be associated with different users, patients, or customers in the same household (e.g., spouses, parent-child relationships, representatives/care givers, etc.), and/or the like. Referring also to FIG. 5 and queue 500, requests 1 and 5 are both for "John Smith" and may be determined as being associated requests. Similarly, requests 1 and 2 are respectively for "John Smith" and "Jane Smith," and based on surname, address, common requestor, etc., it may be determined that these requests are associated.

In step 604 of flow diagram 600, it is determined if linking the requests determined in step 602 provides for certain criteria to be met. For instance, this may be ascertained in step 606, step 608, and/or step 610 as described here and elsewhere in this description, e.g., by fulfillment manager 312 of system 300 in FIG. 3. In step 606 it may be determined if linking the requests reduces fulfillment costs; in step 608 it may be determined if linking the requests reduces fulfillment locations required; and in step 610 it may be determined if linking the requests reduces fulfillment time. The results of these determinations may be used by fulfillment manager 312 in step 612 to determine if a reduction is achieved by any of the criteria being met. That is, if one or more of the determinations in step 606, step 608, and/or step 610 indicate a "yes" result that a reduction of some factor (e.g., cost, number of fulfillers needed, and/or time) is achieved by linking the requests together for common fulfillment, fulfillment manager 312 may cause queue manager 308 to link these requests (e.g., using a flag or other field in the data structure of queue 500) for common provision to a single/particular fulfiller for fulfillment.

As noted above, with respect to queue 500, entries of requests in queue 500 may have commonalities for linking. In the case of requests 1 and 5, while both are for "John Smith," the default fulfiller specified is different for these requests. Fulfillment manager 312 may determine that "Pharmacy 1" is capable of immediately fulfilling both of these requests (i.e., for both of "eRx 1" and "eRx 4"), but that "Pharmacy 4" is not so capable or is incapable of fulfilling the request in position 1 for "eRx 1," etc. In such a scenario, both requests may be linked together and marked for provision to the fulfiller noted as "Pharmacy 1," and a notification to this effect may be provided to the user device and/or the requestor. Similarly, linking may be performed based on either fulfiller allowing for a lower cost of fulfillment, a faster fulfillment time, and also based on preferences provided by the user. Likewise, in the case above for the "John Smith" and "Jane Smith" commonality, the requests in positions 1 and 2 of queue 500 may be linked for a batch provision to the fulfiller when the request for "John Smith" in position 1 is ready for distribution to "Pharmacy 1," thus reducing network transactions, freeing space in queue 500 for the request related to "Jane Smith" (i.e., providing the request from the queue prior to its default time even if no other criteria for distribution have been activated), etc. Still further, the above two scenarios can be combined such that requests in positions 1, 2, and 5 of queue 500 are all batched together and provided to a single fulfiller. Alternatively, in scenarios where fulfillment may be blocked, e.g., for restricted fulfillments that are only allowed after specific time periods have elapsed), linking may not be performed, in embodiments, or may only be performed after the time period passes.

Accordingly, if a reduction is determined in step 612, flow diagram 600 continues to step 614 where such linking as described above is performed; if not, flow diagram 600 continues to step 616 where the requests are maintained separately and un-linked in the queue.

Figure 7:
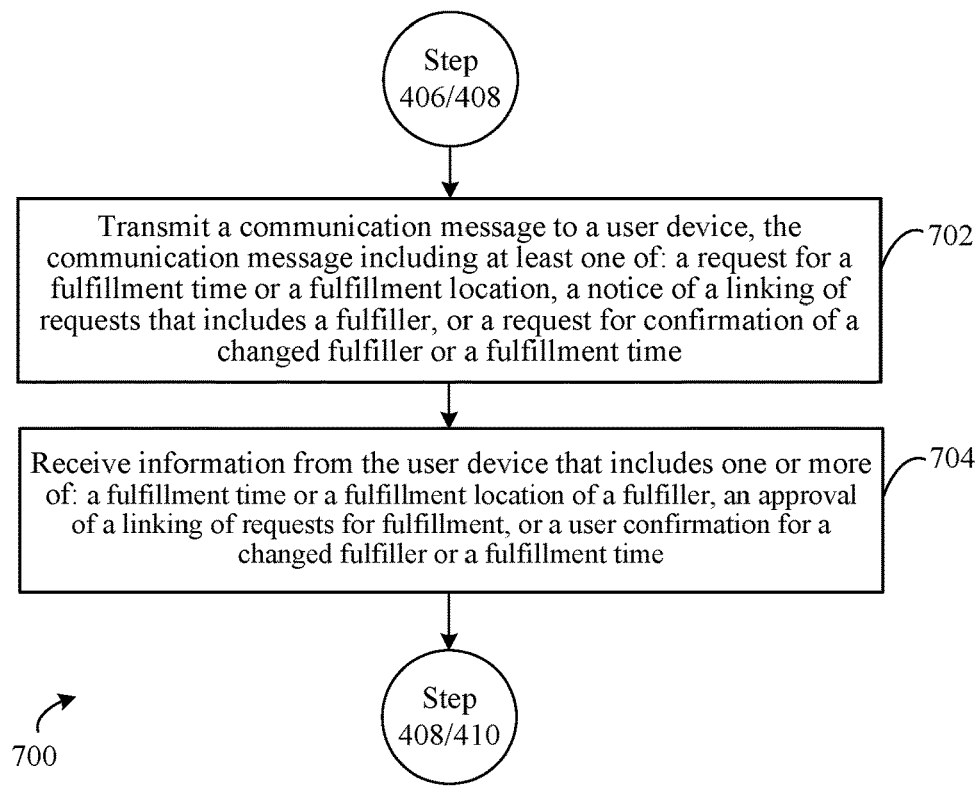
FIG. 7 shows a flowchart for dynamic routing of queued network-based communications using real-time information and machine learning, according to an example embodiment.

In FIG. 7, a flowchart 700 is shown for dynamic routing of queued network-based communications using real-time information and machine learning, according to an example embodiment. Further structural and operational examples will be apparent to persons skilled in the relevant art(s) based on the following descriptions. Flowchart 700 may be an embodiment of flowchart 400, and is described as follows with respect to FIGS. 2-6. In embodiments, one or more steps of flowchart 700 may not be performed.

Flowchart 700 begins at step 702, which may be performed subsequent to step 406 and/or step 408 of flowchart 400 in FIG. 4. In step 702, a communication message is transmitted to a user device, the communication message including at least one of: a request for a fulfillment time or a fulfillment location, a notice of a linking of requests that includes a fulfiller, or a request for confirmation of a changed fulfiller or a fulfillment time. For instance, fulfillment manager 312 of system 300 in FIG. 3, may cause the communication message to be provided to a user device, e.g., user device(s) 216 in FIG. 2, based at least on a request being received, a linking, a determination of a fulfiller in the vicinity of the user device (e.g., based on geolocation information), a determined future location, and/or the like, as described herein. The communication message may be transmitted via text protocols, email, and/or over a network to an application executing/executable at the user device. In embodiments, such communication messages may cause the application to become active from an inactive state to provide an alert to the user regarding the communication message.

In step 704, information is received from the user device that includes one or more of: a fulfillment time or a fulfillment location of a fulfiller, an approval of a linking of requests for fulfillment, or a user confirmation for a changed fulfiller or a fulfillment time. For example, a user/user device may provide such information based on the communication message in step 702 which may be received by fulfillment manager 312. In embodiments, fulfillment manager 312 may perform, or cause to be performed, additional steps of flowchart 400 in FIG. 4 based at least on the received information. The information may be received via text protocols (e.g., by reply to a communication message in step 702), email, and/or over a network from an application executing/executable at the user device. From step 704, in embodiments, processing may return to step 408 and/or step 410 of flowchart 400.

In embodiments, information such as geolocation information, planned travel, etc., for the user of the user device may be provided as periodic updates, e.g., via an "app" of the user device, when the user has an associated request queued for fulfillment. In furtherance of such embodiments, FIG. 8 will now be described.

Figure 8:
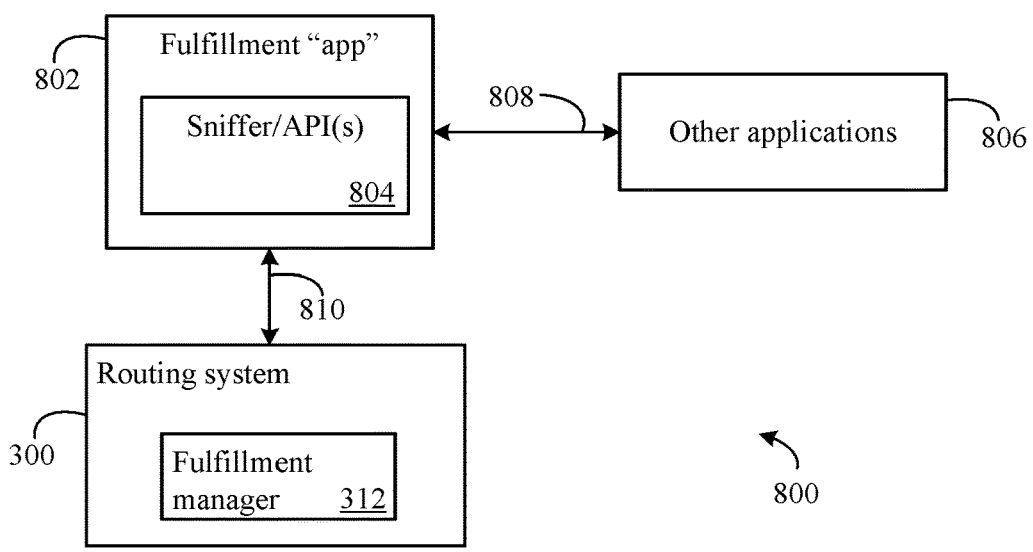
FIG. 8 shows a flow diagram for dynamic routing of queued network-based communications using real-time information and machine learning, according to an example embodiment.

FIG. 8 shows a flow diagram 800 for dynamic routing of queued network-based communications using real-time information and machine learning, according to an example embodiment. Flow diagram 800 includes a fulfillment application ("app") 802 that includes a sniffer or API(s) 804 configured to determine information from other applications 806, each of which may be a component of a user device, such as user device(s) 216 of FIG. 2. Fulfillment app 802 is configured to communicate such determined information with fulfillment manager 312 of routing system 300 from FIG. 3, in embodiments.

In embodiments, fulfillment app 802 may be provided from a fulfiller or may be provided from an entity that hosts routing system 300. Fulfillment app 802 is configured to determine information regarding user preferences (e.g., via user inputs at a user interface (UI) and/or settings), user device location (e.g., via a GPS unit of the user device, via cellular tower information, etc.), responses to requests from fulfillment manager 312 (e.g., via user inputs at a UI and/or settings), confirmations(e.g., via user inputs and/or settings), and/or the like, as described herein, via sniffing and/or API calls 808 performed by sniffer/API(s) 804. Fulfillment app 802 is also configured to provide such information to fulfillment manager 312 via any type of electronic messages 810.

In embodiments, fulfillment app 802 may provide, via a UI, a listing of requests associated with the user, including linked requests, for display to the user. A user is thus enabled to select one or more of their requests for management via fulfillment app 802.

III. Further Example Embodiments and Advantages

As described, systems and devices embodying the techniques herein may be configured and enabled in various ways to perform their respective functions. In some example embodiments, one or more of the operations of the flowcharts and/or flow diagrams described herein may not be performed. Moreover, operations in addition to or in lieu of the operations of the flowcharts and/or flow diagrams described herein may be performed. Further, in some example embodiments, one or more of the operations of the flowcharts and/or flow diagrams described herein may be performed out of order, in an alternate sequence, or partially (or completely) concurrently with each other or with other operations.

Embodiments and techniques, including methods, described herein may be performed in various ways such as, but not limited to, being implemented by hardware, or hardware combined with one or both of software and firmware. As described herein, systems, devices, components, etc., of the embodiments that are configured to perform functions and/or operations are also contemplated as performing such functions and/or operations.

Various embodiments for dynamic routing of queued network-based communications using real-time information and/or machine learning in the context of the systems, flowcharts, and flow diagrams described herein are provided below.

In embodiments, the final selection for fulfillment (eRx dispensing, for example) may be designated to a particular fulfiller (a pharmacy for example) where the end routing of the eRx can be controlled by that pharmacy using an internal pharmacy systems, external pharmacy applications, or a pharmacy controlled user interaction. This may include the use case of a pharmacy phone application (e.g., an "app" on a smartphone) to allow selection of a pharmacy in real time by the user.

In embodiments, the final fulfillment selection may be controlled via a patient or user or consumer controlled application, web server, device, or user directed service in order to facilitate selection of a destination of the patient's or user's or consumer's choice. This may include time deferment and location selection.

In embodiments, the final fulfillment selection may be controlled or influenced by drug or product or service availability, or by location-based allocations. This may include real-time inventory data, real-time schedule availability, real-time or batch delivery data, production and delivery data, and/or distribution data, including delivery schedules.

In embodiments, the final fulfillment selection may be based on geolocation data provided by the patient or user or consumer, their representative, fulfiller or requestor controlled application(s), device, or agents. This may include the optimization of fulfillment location selection based on nearest location, as well as the combination of this element and any other selection criteria.

In embodiments, the final fulfillment selection may be based on a wait time for fulfillment, a fulfiller's availability, customer density, unfilled item/product/service queue size, average, peak, or minimum wait times, location fulfillment capacity, and/or state, local or federal legal restrictions.

In embodiments, the final fulfillment selection may be based on pricing and cost data that affects the fulfillment costs to be directly paid by the patient/user/consumer, insurance costs, insurance coverage ratios, net or gross costs, deductible coverage and fulfillment, payment type, availability of payment options, coupons, discounts, and/or any other variable related to the fulfillment cost.

In embodiments, the final fulfillment selection may be based on the availability for delivery to a destination that may include a requestor or fulfiller selection. This selection may be supplemented with the use of geolocation data from the requestor or fulfiller.

In embodiments, the final fulfillment selection to be based on the attributes of another eRx transaction using any or all of the constraints and options listed herein.

In embodiments, the final fulfillment selection may be based on time of day constraints and/or rules, including but not limited to automatic re-routing based on store hours, time based deferments for changes in operations associated with fulfiller (e.g., pharmacist off duty, etc.).

In embodiments, the final fulfillment selection may be based on health guidelines issued by local, state, or federal authorities. This may include density criteria, scheduled times of pickup, exposure controls, and/or any other public health variables that may restrict availability and/or delivery of a time or service, e.g., an eRx.

In embodiments, the example workflows above may encompass the ability of an eRx to enter a holding queue before eventual dispatch to a delivery location for fulfillment. The control of such a queue may include one or more of the following. (1) A requestor, e.g., prescribing doctor, interface controlled by the prescribing doctor or associate staff. This may include services offered by the software EHR (electronic health records) vendor. (2) Receiving pharmacist controls that are performed by a pharmacist in order to facilitate the use cases listed herein. (3) Automated control systems, including the use of machine learning and artificial intelligence to aid in the selection of a destination as described in the use cases herein. (4) Automated geolocation-based routing using device, application, and/or user generated data. (5) Patient controlled applications, devices, and/or user directed services. (6) Third party devices, applications, or services designed to provide assistance to a patient. This may include access from a third party for the purpose of assisted management, elder care, legal care taker, and/or other care taking situations. In embodiments, as shown above, third-party entities may include non-fulfiller entities, i.e., entities that are not the fulfiller entity.

Embodiments herein also contemplate automated and/or manual constraints in the queue selection process that are derived from one or more of: insurance coverage, drug availability, and/or delivery constraints; in the case of specialty drugs, the availability of drug specific equipment, procedures, and/or labor; changes in authorization, including legal constraint, insurance and pharmacy benefits management (PBM) specific requirements, as well as any type of best practice review.

Embodiments herein also contemplate the implementation of quality control systems while an eRx is in a queued state. This may include both manual and automated quality control strategies.

Embodiments herein also contemplate the ability of price, availability, wait time, delivery method, and/or other selection criteria to be based on a bidding system (e.g., price matching).

Embodiments herein also contemplate the use of pharmacy brand specific application integration to enable pharmacy system specific criteria to be utilized for implementations. This may include integrations into pharmacy specific user applications (e.g., "apps" on a smartphone or other user device).

Embodiments herein also contemplate the use of pharma-specific application integration, which may include usage information.

Embodiments herein also contemplate that queuing by systems/devices may include the ability to create duplication forks in the described workflows to allow for the ability to route request data to additional destinations, e.g., in an eRx context, to a health management application, a health tracking application, a reminder and/or calendar application or device, and/or some other patient controlled destination.

Embodiments herein also contemplate that queuing by systems/devices may include the implementation of control rules such that request routing for fulfillment may occur automatically after a time delay, a change in availability, wait times, other delivery restrictions, a time of expiration, a time of automated choice selection, or a window selected by a requestor and/or user/consumer, a directive or change in coverage, cost, out of pocket cost, deductible coverage, etc. In the eRx context, routing may be redirected by the same variables or considerations as noted above by either the prescriber, pharmacy, PBM, insurer, and/or patient. In embodiments, a default fulfiller may be set in the system, and chosen based on timeout/delay.

Embodiments herein also contemplate further expansion or extensibility into scenarios of multiple transactions, e.g., more than one eRx fulfillment request, including without limitation: common patient eRx transactions in order to facilitate single pickup/fulfillment locations, reduced total wait time, reduced cost, or any of the geolocation, availability, or other cost variables; non-common patient eRx transactions being picked up, delivered, or otherwise combined (including cases of spouse, dependents, and/or caretaker prescription fulfillment); and/or the combination of eRx transactions of different types including both new and renewal (e.g., for time optimization, cost optimization, and/or location availability).

Embodiments herein also contemplate further expansion or extensibility into scenarios for use cases involving a patient who is traveling or otherwise away from their primary prescribing area. This use case may include allowing other designated controllers, applications, and/or user agents.

Further embodiments of the queuing of requests by systems/devices may include integration into pharmacy or non-pharmacy delivery systems. Such integration allows for routing to occur based on a combination of drug availability and destination delivery options that may include combinations with other scheduled or unscheduled delivery events. The ability to link eRx delivery into other preexisting delivery infrastructure is also contemplated herein.

The embodiments herein improve system operation and efficiency by preventing changes and new transmissions of requests when a fulfiller location is changed after a request is initially sent. Accordingly, there are fewer processing cycles and less memory required by computing devices sending requests (e.g., eliminating additional entries via UIs of eRx's), and fewer data transmissions sent over the network and received by fulfillers. Embodiments also provide for price shopping for fulfillments to find lower costs, e.g., coupons, or for low-price bidding by fulfillers where a request is routed to a fulfiller based on cost.

The embodiments herein improve system operation and efficiency by handling surges of network load (peak node) of requests that impede system throughput. Additionally, host server operational efficiency is improved over current synchronous solutions at least because the embodiments herein provide asynchronous request distribution for fulfillments via queuing described herein which allows batch verifications to fulfillers (e.g., many-to-one). Still further, a server host is enabled to take ownership of requests from requestors and respond when requests are received, thus improving efficiency and speed for responses.

Embodiments also expand on the application of ML and artificial intelligence where learning is utilized for patient behaviors to queue/route an eRx, and also take into account hours of operation for fulfillers.

The embodiments herein also provide for notifications to requestors, patients, consumers, and users when the user "app" is not open or active, i.e., waking up the "app" when the request is delivered, when fulfillment takes place, and/or when a fulfillment candidate is identified. Additionally, alternative communications such as text, telephone calls, emails, etc., are contemplated for user notifications and may be provided/performed in a similar manner in order to provide notifications to the user, including when the app is not open and/or active.

Regarding the use of geolocation data to dynamically determine selection of a fulfiller, the embodiments herein also provide for utilizing geolocation of items, services, products, drugs, etc., (e.g., for rare/specific drugs), and correlate this information with locations of requestors, patients, users, consumers, etc. Projections of future geolocation data, e.g., based on a planned trip such as errands, may be determined for embodiments, by sniffing "app" data, navigation data, calendar data, etc., via application program interface (API) calls to applications, and/or the like.

The embodiments herein also provide for a requestor to specify a fulfiller based on criteria for the fulfiller and/or fulfiller personnel in order to re-route requests (e.g., when a criteria meeting fulfiller becomes available). In embodiments, a patient is enabled to set up or provide criteria for a filter (e.g., via their "app") to dynamically perform queuing/routing based on different real-time factors, including information/criteria from other "apps" or sources.

The embodiments also enable efficient management of time sensitive data associated with requests, as described herein. The queue managers and fulfillment managers provided herein allow for the clean up of data that is queued, and includes the ability to not require the deletion of data/information for requests that are not distributed for fulfillment prior to a time period allotted for queuing, but rather allows the sending of such requests to default fulfillers. In embodiments, this may be performed with additional information for requests to not be fulfilled until the fulfiller is contacted by the user/customer/patient. Additionally, queues herein may operate generally according to FIFO protocols where the embodiments herein may override such behaviors and cause requests to be de-queued out of order based at least on user preferences, real-time information regarding geolocation, linking of requests, and/or the like, as described herein.

IV. Example Processing Device Implementations

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, system 100 in FIG. 1, system 200 in FIG. 2, and system 300 of FIG. 3, along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 9:
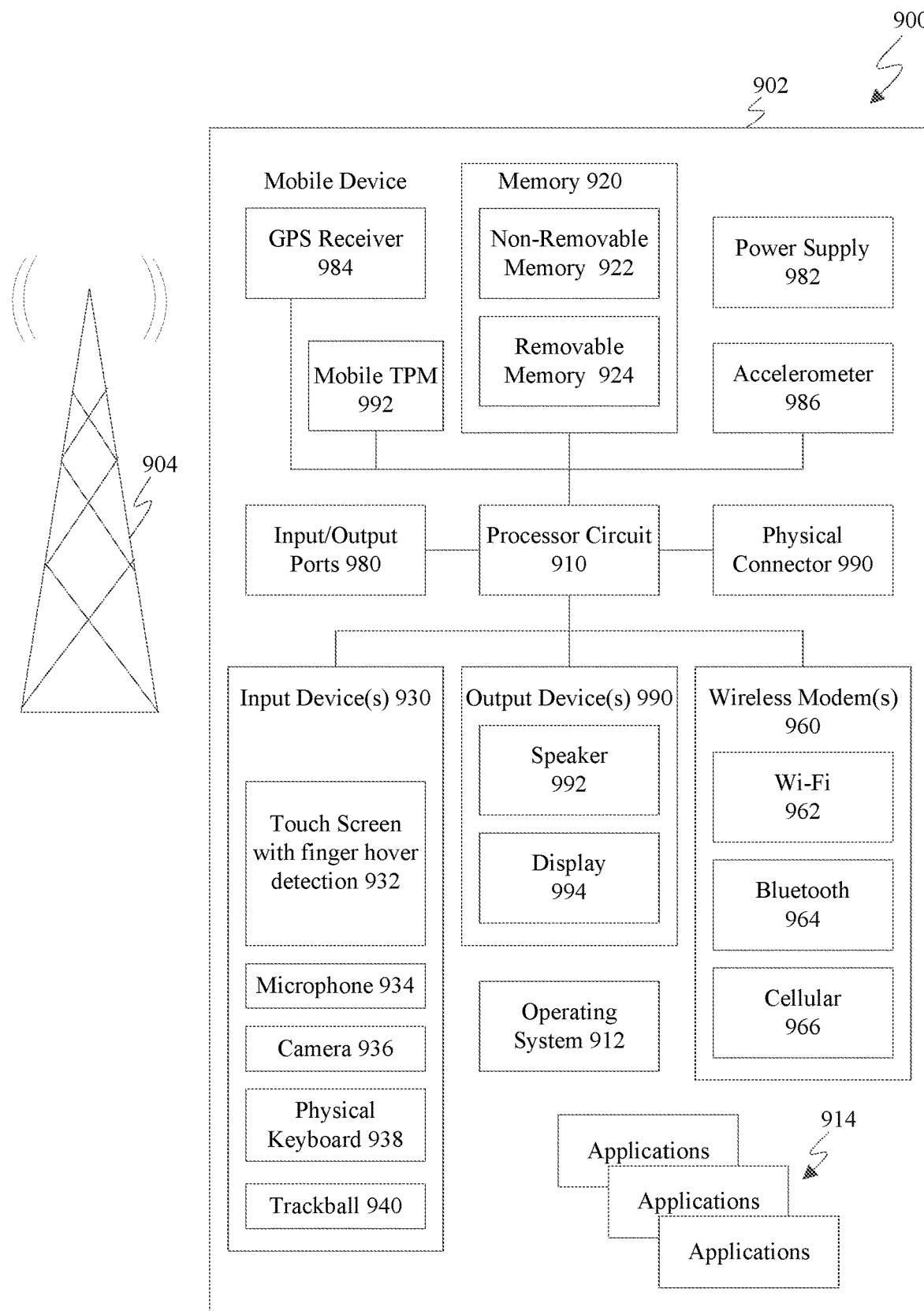
FIG. 9 shows a block diagram of a mobile device/system in which the techniques disclosed herein may be performed and the embodiments herein may be utilized.

FIG. 9 is a block diagram of an exemplary mobile system 900 that includes a mobile device 902 that may implement embodiments described herein. For example, mobile device 902 may be used to implement any system, client, or device, or components/subcomponents thereof, in the preceding sections. As shown in FIG. 9, mobile device 902 includes a variety of optional hardware and software components. Any component in mobile device 902 can communicate with any other component, although not all connections are shown for ease of illustration. Mobile device 902 can be any of a variety of computing devices (e.g., cell phone, smartphone, handheld computer, Personal Digital Assistant (PDA), etc.) and can allow wireless two-way communications with one or more mobile communications networks 904, such as a cellular or satellite network, or with a local area or wide area network.

Mobile device 902 can include a controller or processor 910 (e.g., signal processor, microprocessor, ASIC, or other control and processing logic circuitry) for performing such tasks as signal coding, data processing, input/output processing, power control, and/or other functions. An operating system 912 can control the allocation and usage of the components of mobile device 902 and provide support for one or more application programs 914 (also referred to as "applications" or "apps"). Application programs 914 may include common mobile computing applications (e.g., e-mail applications, calendars, contact managers, web browsers, messaging applications) and any other computing applications (e.g., word processing applications, mapping applications, media player applications).

Mobile device 902 can include memory 920. Memory 920 can include non-removable memory 922 and/or removable memory 924. Non-removable memory 922 can include RAM, ROM, flash memory, a hard disk, or other well-known memory devices or technologies. Removable memory 924 can include flash memory or a Subscriber Identity Module (SIM) card, which is well known in GSM communication systems, or other well-known memory devices or technologies, such as "smart cards." Memory 920 can be used for storing data and/or code for running operating system 912 and application programs 914. Example data can include web pages, text, images, sound files, video data, or other data to be sent to and/or received from one or more network servers or other devices via one or more wired or wireless networks. Memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 920. These programs include operating system 912, one or more application programs 914, and other program modules and program data. Examples of such application programs or program modules may include, for example, computer program logic (e.g., computer program code or instructions) for implementing one or more of system 100 in FIG. 1, system 200 in FIG. 2, and system 300 of FIG. 3, along with any components and/or subcomponents thereof, as well as the flowcharts/flow diagrams described herein, including portions thereof, and/or further examples described herein.

Mobile device 902 can include a mobile TPM 992. Mobile TPM 992 may be a mobile device equivalent embodiment of a TPM, as would be understood by one of skill in the relevant art(s) having the benefit of this disclosure. For example, mobile TPM 992 may be configured to perform one or more functions or operations of TPMs for various embodiments herein.

Mobile device 902 can support one or more input devices 930, such as a touch screen 932, a microphone 934, a camera 936, a physical keyboard 938 and/or a trackball 940 and one or more output devices 990, such as a speaker 992 and a display 994. Other possible output devices (not shown) can include piezoelectric or other haptic output devices. Some devices can serve more than one input/output function. For example, touch screen 932 and display 994 can be combined in a single input/output device. Input devices 930 can include a Natural User Interface (NUI).

One or more wireless modems 960 can be coupled to antenna(s) (not shown) and can support two-way communications between processor 910 and external devices, as is well understood in the art. Modem 960 is shown generically and can include a cellular modem 966 for communicating with the mobile communication network 904 and/or other radio-based modems (e.g., Bluetooth 964 and/or Wi-Fi 962). At least one wireless modem 960 is typically configured for communication with one or more cellular networks, such as a GSM network for data and voice communications within a single cellular network, between cellular networks, or between the mobile device and a public switched telephone network (PSTN).

Mobile device 902 can further include at least one input/output port 980, a power supply 982, a satellite navigation system receiver 984, such as a Global Positioning System (GPS) receiver, an accelerometer 986, and/or a physical connector 990, which can be a USB port, IEEE 1394 (FireWire) port, and/or RS-232 port. The illustrated components of mobile device 902 are not required or all-inclusive, as any components can be deleted and other components can be added as would be recognized by one skilled in the art.

In an embodiment, mobile device 902 is configured to implement any of the above-described features of flowcharts herein. Computer program logic for performing any of the operations, steps, and/or functions described herein may be stored in memory 920 and executed by processor 910.

Figure 10:
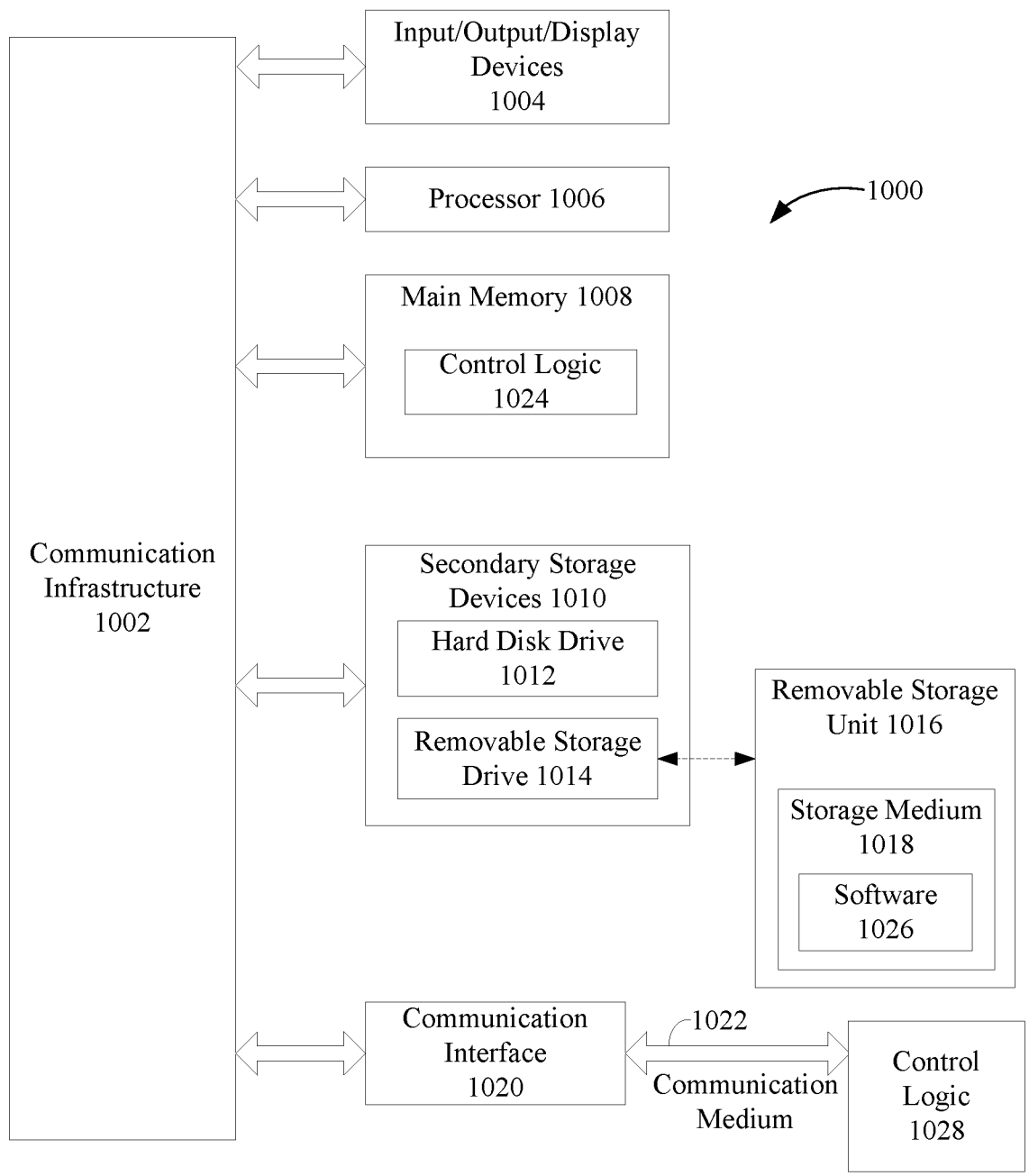
FIG. 10 shows a block diagram of a processing device/system in which the techniques disclosed herein may be performed and the embodiments herein may be utilized.

The embodiments described herein, including devices, systems, methods/processes, and/or apparatuses, may be implemented in or using processing devices, communication systems, servers, and/or computers, such as a processing device 1000 shown in FIG. 10. It should be noted that processing device 1000 may represent mobile devices, communication devices/systems, entertainment systems/devices, processing devices, and/or traditional computers in one or more embodiments. For example, a resource generation system as described herein, and any of the sub-systems and/or components respectively contained therein and/or associated therewith, along with further embodiments thereof, may be implemented in or using one or more processing devices 1000 and/or similar computing devices.

Processing device 1000 can be any commercially available and well known communication device, processing device, and/or computer capable of performing the functions described herein, such as devices/computers available from International Business Machines®, Apple®, Sun®, HP®, Dell®, Cray®, Samsung®, Nokia®, etc. Processing device 1000 may be any type of computer, including a desktop computer, a server, etc., and may be a computing device or system within another device or system.

Processing device 1000 includes one or more processors (also called central processing units, or CPUs), such as a processor 1006. Processor 1006 is connected to a communication infrastructure 1002, such as a communication bus. In some embodiments, processor 1006 can simultaneously operate multiple computing threads, and in some embodiments, processor 1006 may comprise one or more processors.

Processing device 1000 also includes a primary or main memory 1008, such as random access memory (RAM). Main memory 1008 has stored therein control logic 1024 (computer software), and data.

Processing device 1000 also includes one or more secondary storage devices 1010. Secondary storage devices 1010 include, for example, a hard disk drive 1012 and/or a removable storage device or drive 1014, as well as other types of storage devices, such as memory cards and memory sticks. For instance, processing device 1000 may include an industry standard interface, such a universal serial bus (USB) interface for interfacing with devices such as a memory stick. Removable storage drive 1014 represents a floppy disk drive, a magnetic tape drive, a compact disk drive, an optical storage device, tape backup, etc.

Removable storage drive 1014 interacts with a removable storage unit 1016. Removable storage unit 1016 includes a computer usable or readable storage medium 1018 having stored therein computer software 1026 (control logic) and/or data. Removable storage unit 1016 represents a floppy disk, magnetic tape, compact disk, DVD, optical storage disk, or any other computer data storage device. Removable storage drive 1014 reads from and/or writes to removable storage unit 1016 in a well-known manner.

Processing device 1000 also includes input/output/display devices 1004, such as touchscreens, LED and LCD displays, monitors, keyboards, pointing devices, etc.

Processing device 1000 further includes a communication or network interface 1020. Communication interface 1020 enables processing device 1000 to communicate with remote devices. For example, communication interface 1020 allows processing device 1000 to communicate over communication networks or mediums 1022 (representing a form of a computer usable or readable medium), such as LANs, WANs, the Internet, etc. Network interface 1020 may interface with remote sites or networks via wired or wireless connections.

Control logic 1028 may be transmitted to and from processing device 1000 via the communication medium 1022.

Any apparatus or manufacture comprising a computer usable or readable medium having control logic (software) stored therein is referred to herein as a computer program product or program storage device. This includes, but is not limited to, processing device 1000, main memory 1008, secondary storage devices 1010, and removable storage unit 1016. Such computer program products, having control logic stored therein that, when executed by one or more data processing devices, cause such data processing devices to operate as described herein, represent embodiments.

Techniques, including methods, and embodiments described herein may be implemented by hardware (digital and/or analog) or a combination of hardware with one or both of software and/or firmware. Techniques described herein may be implemented by one or more components. Embodiments may comprise computer program products comprising logic (e.g., in the form of program code or software as well as firmware) stored on any computer usable medium, which may be integrated in or separate from other components. Such program code, when executed by one or more processor circuits, causes a device to operate as described herein. Devices in which embodiments may be implemented may include storage, such as storage drives, memory devices, and further types of physical hardware computer-readable storage media. Examples of such computer-readable storage media include, a hard disk, a removable magnetic disk, a removable optical disk, flash memory cards, digital video disks, random access memories (RAMs), read only memories (ROM), and other types of physical hardware storage media. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, flash memory cards, digital video discs, RAM devices, ROM devices, and further types of physical hardware storage media. Such computer-readable storage media may, for example, store computer program logic, e.g., program modules, comprising computer executable instructions that, when executed by one or more processor circuits, provide and/or maintain one or more aspects of functionality described herein with reference to the figures, as well as any and all components, capabilities, and functions therein and/or further embodiments described herein.

Such computer-readable storage media are distinguished from and non-overlapping with communication media and modulated data signals (i.e., do not include communication media or modulated data signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media and signals transmitted over wired media. Embodiments are also directed to such communication media.

The techniques and embodiments described herein may be implemented as, or in, various types of circuits, devices, apparatuses, and systems. For instance, embodiments may be included, without limitation, in processing devices (e.g., illustrated in FIG. 10) such as computers and servers, as well as communication systems such as switches, routers, gateways, and/or the like, communication devices such as smart phones, home electronics, gaming consoles, entertainment devices/systems, etc. A device, as defined herein, is a machine or manufacture as defined by 35 U.S.C. § 101. That is, as used herein, the term "device" refers to a machine or other tangible, manufactured object and excludes software and signals. Devices may include digital circuits, analog circuits, or a combination thereof. Devices may include one or more processor circuits (e.g., central processing units (CPUs), processor 1006 of FIG. 10), microprocessors, digital signal processors (DSPs), and further types of physical hardware processor circuits) and/or may be implemented with any semiconductor technology in a semiconductor material, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

V. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A system for dynamic routing of queued network-based communications performed by a host system that includes:
   one or more memory devices that store executable program code; and
   one or more processors operable to access the one or more memory devices and to execute the executable program code, the executable program code being configured to:
      receive, over a network from a requestor system, a request associated with a fulfillment;
      queue the request in a queue comprising a data structure;
      receive information over the network, the information comprising at least one of:
         geolocation information from a user device of a user that is associated with the fulfillment;
         temporal information from the user device; or
         related request information associated with another request;
      link the request to a previously-queued request in the queue based on at least one of a common patient or a relationship between a patient and a non-common patient, said link being based at least on providing one or more of a single fulfillment location, a reduced fulfillment cost, or a reduced fulfillment time;
      select a fulfiller from a plurality of fulfillers and determine a fulfillment time for the fulfillment, said selection and determination each based at least on the information and the link, wherein fulfillment times are times at which requests are transmitted from the queue; and
      provide, from the queue, the request and the previously-queued request to the fulfiller at the fulfillment time over the network.

2. The system of claim 1, wherein the request includes a pre-designated fulfiller to complete the fulfillment; and
   wherein said queue is performed irrespective of the pre-designated fulfiller being included in the request.

3. The system of claim 1, wherein the information comprises one or more of the geolocation information, the temporal information, the related request information, or fulfiller information from a fulfiller system; and
   wherein one or more of the geolocation information, the temporal information, the related request information, or the fulfiller information include real-time information.

4. The system of claim 1, wherein the requestor system is associated with a physician's office, the request associated with the fulfillment is an electronic prescription, and the fulfiller system is associated with a pharmacy;
   wherein the executable program code is configured to provide a notification to at least one of the user device or the requestor system that indicates the request was provided to the fulfiller.

5. The system of claim 1, wherein the geolocation information from the user device includes projected geolocation information predictive of a future location of the user.

6. The system of claim 1, wherein said select the fulfiller from the plurality of fulfillers and determine the fulfillment time for the fulfillment includes to determine a non-fulfiller entity associated with at least one of the user or the fulfillment; and wherein the executable program code is configured to:
provide information associated with the request to the non-fulfiller entity over the network.

7. A method for dynamic routing of queued network-based communications performed by a host system, the method comprising:

receiving, over a network from a requestor system, a request associated with a fulfillment;

queuing the request in a queue comprising a data structure;

receiving information over the network, the information comprising at least one of:
geolocation information from a user device of a user that is associated with the fulfillment;
temporal information from the user device; or
related request information associated with request fulfillment;

linking the request to a previously-queued request in the queue based on at least one of a common patient or a relationship between a patient and a non-common patient, said link being based at least on providing one or more of a single fulfillment location, a reduced fulfillment cost, or a reduced fulfillment time;

selecting a fulfiller from a plurality of fulfillers and determining a fulfillment time for the fulfillment, said selecting and determining each based at least on the information and said linking, wherein fulfillment times are times at which requests are transmitted from the queue; and providing, from the queue, the request and the previously-queued request to the fulfiller at the fulfillment time, or at another fulfillment time, over the network.

8. The method of claim 7, wherein the request includes a pre-designated fulfiller to complete the fulfillment; and
wherein said queuing is performed irrespective of the pre-designated fulfiller being included in the request.

9. The method of claim 7, wherein the information comprises one or more of the geolocation information, the temporal information, the related request information, or fulfiller information from a fulfiller system; and
wherein one or more of the geolocation information, the temporal information, the related request information, or the fulfiller information include real-time information.

10. The method of claim 7, wherein the requestor system is associated with a physician's office, the request associated with the fulfillment is an electronic prescription, and the fulfiller system is associated with a pharmacy;
the method further comprising providing a notification to at least one of the user device or the requestor system that indicates the request was provided to the fulfiller.

11. The method of claim 7, wherein the geolocation information from the user device includes projected geolocation information predictive of a future location of the user.

12. The method of claim 7, wherein said selecting the fulfiller from the plurality of fulfillers and determining the fulfillment time for the fulfillment includes determining a non-fulfiller entity associated with at least one of the user or the fulfillment;
the method further comprising:
providing information associated with the request to the non-fulfiller entity over the network.

13. A computer-readable storage medium having program instructions encoded thereon that are executable by one or more processors to perform a computer-implemented method, the method comprising:

receiving, over a network from a requestor system, a request associated with a fulfillment;

queuing the request in a queue comprising a data structure;

receiving information over the network, the information comprising at least one of:
geolocation information from a user device of a user that is associated with the fulfillment;
temporal information from the user device; or
related request information associated with request fulfillment;

linking the request to a previously-queued request in the queue based on at least one of a common patient or a relationship between a patient and a non-common patient, said link being based at least on providing one or more of a single fulfillment location, a reduced fulfillment cost, or a reduced fulfillment time;

selecting a fulfiller from a plurality of fulfillers and determining a fulfillment time for the fulfillment, said selecting and determining each based at least on the information and said linking, wherein fulfillment times are times at which requests are transmitted from the queue; and providing, from the queue, the request to the fulfiller at the fulfillment time, or at another fulfillment time, over the network.

14. The computer-readable storage medium of claim 13, wherein the request includes a pre-designated fulfiller to complete the fulfillment; and
wherein said queuing is performed irrespective of the pre-designated fulfiller being included in the request.

15. The computer-readable storage medium of claim 13, wherein the information comprises one or more of the geolocation information, the temporal information, the related request information, or fulfiller information from a fulfiller system; and
wherein one or more of the geolocation information, the temporal information, the related request information, or the fulfiller information include real-time information.

16. The computer-readable storage medium of claim 13, wherein the requestor system is associated with a physician's office, the request associated with the fulfillment is an electronic prescription, and the fulfiller system is associated with a pharmacy;
wherein the method further comprises providing a notification to at least one of the user device or the requestor system that indicates the request was provided to the fulfiller.

17. The computer-readable storage medium of claim 13, wherein the geolocation information from the user device includes projected geolocation information predictive of a future location of the user; or
wherein said selecting the fulfiller from the plurality of fulfillers and determining the fulfillment time for the fulfillment includes determining a non-fulfiller entity associated with at least one of the user or the fulfillment, and wherein the method further comprises providing information associated with the request to the non-fulfiller entity over the network.

* * * * *